(12) United States Patent
Kani (10) Patent No.: US 8,281,303 B2
(45) Date of Patent: Oct. 2, 2012

(54) DYNAMIC EJECTION OF VIRTUAL DEVICES ON EJECTION REQUEST FROM VIRTUAL DEVICE RESOURCE OBJECT WITHIN THE VIRTUAL FIRMWARE TO VIRTUAL RESOURCE DRIVER EXECUTING IN VIRTUAL MACHINE

(75) Inventor: Toshimitsu Kani, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1371 days.

(21) Appl. No.: 11/932,440

(22) Filed: Oct. 31, 2007

(65) Prior Publication Data

US 2009/0113422 A1 Apr. 30, 2009

(51) Int. Cl.
*G06F 9/455* (2006.01)
(52) U.S. Cl. .................................. 718/1; 713/1
(58) Field of Classification Search .......... 718/1; 713/1, 713/2; 711/170
See application file for complete search history.

(56) References Cited

U.S. PATENT DOCUMENTS

| | | | | |
|---|---|---|---|---|
| 4,253,145 | A * | 2/1981 | Goldberg | 703/21 |
| 4,649,479 | A * | 3/1987 | Advani et al. | 718/1 |
| 5,898,861 | A * | 4/1999 | Emerson et al. | 703/23 |
| 2005/0108711 | A1* | 5/2005 | Arnold et al. | 718/100 |
| 2005/0132365 | A1* | 6/2005 | Madukkarumukumana et al. | 718/1 |
| 2005/0283679 | A1* | 12/2005 | Heller et al. | 714/39 |
| 2006/0010450 | A1 | 1/2006 | Culter | |
| 2006/0020779 | A1* | 1/2006 | Rothman et al. | 713/2 |
| 2006/0107262 | A1* | 5/2006 | Bodas et al. | 718/100 |
| 2006/0184938 | A1* | 8/2006 | Mangold | 718/1 |
| 2006/0294401 | A1* | 12/2006 | Munger | 713/300 |
| 2007/0243925 | A1* | 10/2007 | LeMay et al. | 463/20 |

OTHER PUBLICATIONS

Sanjay et al.; NetChannel; A VMM-level Mechanism for continous, transparent device access during VM migration, Mar. 2008, ACM, pp. 31-40.*
Carl A. Waldspurger; Memory Resource Management in VMware EsX server, USENIX, 182-194.*
"Advanced Configuration and Power Interface Specification"; ACPI Software Program Model, Rev. 3.0b; Section 5.6.3; pp. 142-145; Oct. 10, 2006; Copyright 2006 Hewlett-Packard Corporation/Intel Corporation/Microsoft Corporation/Phoenix Technology Ltd./Toshiba Corporation.
"Configuring and Migrating Memory on vPars"; Technical White Paper, 28 pp., Copyright 2007 Hewlett-Packard Development Company.
"Hot-Plug & Partitioning Flows Specification"; A publication of the Consortium of Developers' Interface Guides for Intel Itanium Architecture-based Servers (DIG64), Oct. 2007, 34 pp., Rel. 1.0, Draft 095b (Final Draft); Copyright 2007 Bull SAS.

* cited by examiner

*Primary Examiner* — Meng An
*Assistant Examiner* — Abu Z Ghaffari (57) ABSTRACT

Systems and methods for efficient dynamic allocation of virtual machine resources are described herein. At least some illustrative embodiments include a method including executing virtual machine software on a real computer system (the virtual machine software including a hypervisor and a virtual machine including a plurality of virtual devices), associating each of the plurality of virtual devices with a unique subset of a real device within the real computer system, the hypervisor sending to virtual firmware within the virtual machine a request to eject that requires ejecting from the virtual machine one or more of the plurality of virtual devices, a virtual device resource object within the virtual firmware forwarding the request to eject to a virtual device resource driver executing on the virtual machine, and the virtual device resource driver causing individual ejections of each of the one or more virtual devices in response to the forwarded request.

20 Claims, 11 Drawing Sheets

DYNAMIC EJECTION OF VIRTUAL DEVICES ON EJECTION REQUEST FROM VIRTUAL DEVICE RESOURCE OBJECT WITHIN THE VIRTUAL FIRMWARE TO VIRTUAL RESOURCE DRIVER EXECUTING IN VIRTUAL MACHINE

BACKGROUND

The use of virtual machine software has experienced unprecedented growth in recent times. Originally designed as a software testing platform, virtual machine software emulates and/or simulates the hardware of a real computer system, allowing software that executes on a real machine to be executed within the emulated/simulated environment without modification. The virtualized machine presented by the virtualization software appears as a real computer system to the software executing on such a virtual machine.

With the advent of hot swappable devices in real computer systems, virtual machines are now available that can emulate/simulate the same hot swapping of devices as real machines. This virtual hot swapping capability allows multiple virtual machines, executing on a single real computer system, to dynamically add and remove virtualized hardware resources to the configuration of the virtual machine on an as-needed basis. Further, because the virtual machines emulate/simulate real computer systems, the virtual machines also emulate/simulate the firmware of a real computer system, including industry standard firmware interfaces to the virtualized hardware, such as the Extensible Firmware Interface (EFI) by Intel®, and the Advanced Configuration and Power Interface (ACPI), an open industry standard.

Using such firmware interfaces, hardware is represented by embedded firmware within the real/virtualized computer system as a series of objects, each of which can be managed, via the firmware interface, by software (e.g., an operating system) executing on a processor within the computer system. These objects allow, among other things, devices to be operated as "hot swappable" devices, i.e., devices that can be plugged into or unplugged from the computer system without powering down or rebooting the computer system. For example, when a device is plugged in, the firmware notifies the operating system that the device is available, once the device hardware has been initialized. The notification is provided via the firmware interface used by the computer system (e.g., via one or more ACPI notification messages). Similarly, if a device is to be unplugged, the firmware notifies the operating system that a request to eject the device has been received. The operating system verifies that the device is not in use, and then issues a request to the firmware, via the firmware interface, to "eject" the hardware (e.g., via one or more ACPI requests).

The ability to virtualize hardware resources allows subsets of real hardware resources of a real machine to be represented as individual virtual hardware resources of a reduced size or capability, and further allows these virtualized resources to be hot swapped in and out of one or more virtual machines. Thus, for example, a 1 GB memory within a real computer system may be represented as 8, 128 MB virtual memories, dynamically allocated among one or more virtual machines executing on the real computer system. Each resource allocated to a virtual machine is represented by the virtual firmware of the machine as an object (e.g., an ACPI object), which is made accessible by the firmware interface to the operating system executing on the virtual machine. Each virtual memory can be virtually hot swapped on an as-needed basis into or out of any of the virtual machines executing on the real computer system.

However, larger numbers of objects are sometimes used in order to achieve greater flexibility in the allocation of the subsets of a given resource. The use of large numbers of virtualized resources permits the real resource to be allocated with a finer granularity, and reduces the probability that a request to eject a virtual resource will be rejected because the virtual resource is in use and not available to be re-allocated. But as the number of virtualized resources increases, the overhead associated with re-allocating large numbers of virtualized resources can adversely affect the performance of a system, particularly those system that perform large numbers of such re-allocations (e.g., system that perform dynamic load-balancing between virtual machines).

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software. Also, the term "real computer system" refers to an actual, physical computer system such as, for example, the computer system shown in FIGS. 2A and 2B.

The term "virtual machine" refers to a simulation, emulation or other similar functional representation of a computer system, whereby the virtual machine includes one or more functional components that are not constrained by the physical boundaries that define one or more real or physical computer systems. The functional components can include real or physical devices, interconnect busses and networks, as well as software programs executing on one or more CPUs. A virtual machine may, for example, include a sub-set of functional components that include some but not all functional components within a real or physical computer system; may include some functional components of multiple real or physical computer systems; may include all the functional components of one real or physical computer system, but only some components of another real or physical computer system; or may include all the functional components of multiple real or physical computer systems. Many other combinations are possible, and all such combinations are intended to be within the scope of the present disclosure. Further, the term "virtual," when associated with other components, systems and/or subsystems (e.g., memory, firmware, resources, storage devices and input/output devices) similarly refers to a simulation, emulation or other similar function representation of the component, system and/or subsystem, implemented as part of a virtual machine or as part of a virtual machine software program.

DETAILED DESCRIPTION

Figure 1:
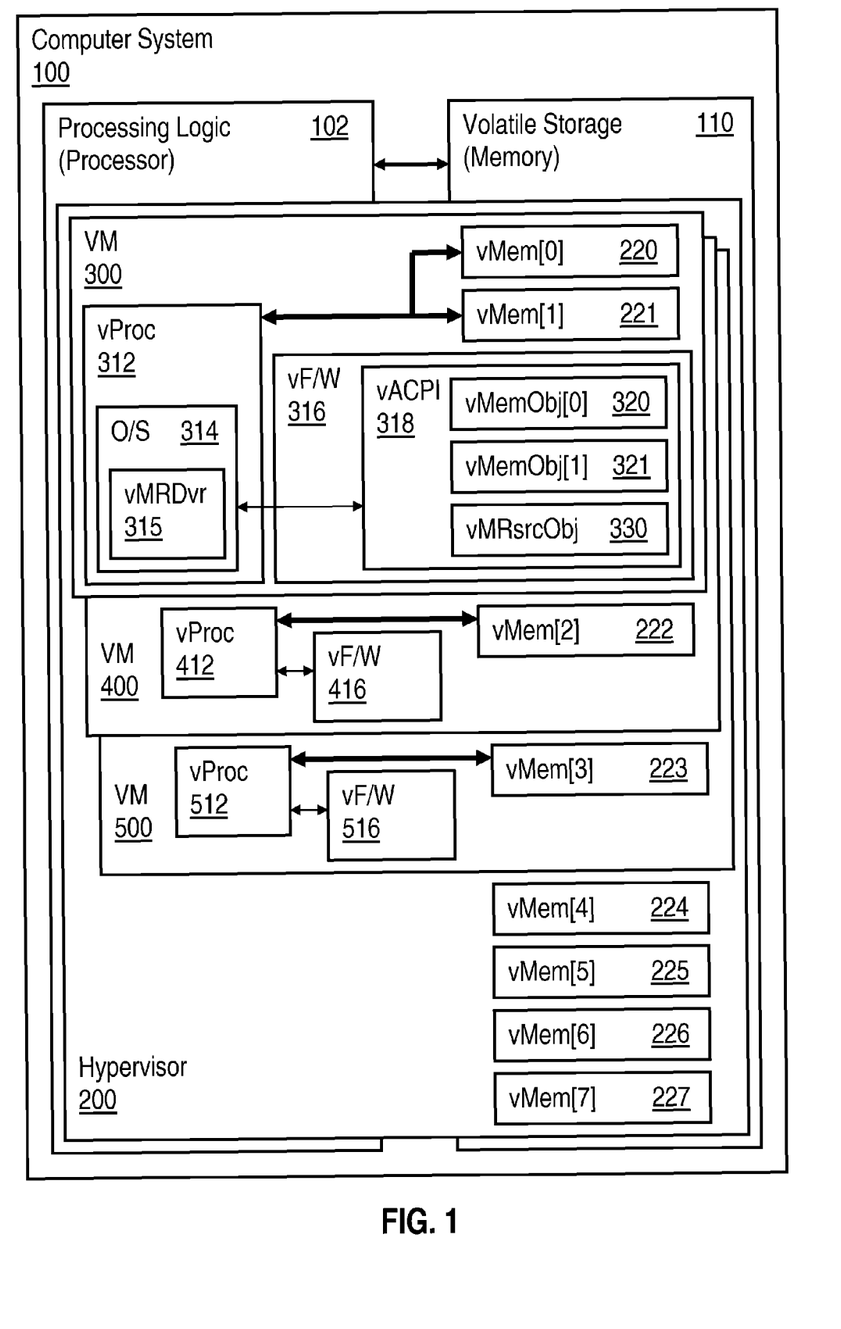
FIG. 1 shows a computer system executing multiple instances of virtual machine software, in accordance with at least some illustrative embodiments.

FIG. 1 shows a computer system 100, which includes processing logic 102 (e.g., a microprocessor) and volatile storage 110 (e.g., random access memory or RAM), suitable for executing virtualization software (including a hypervisor and one or more virtual machines) and constructed in accordance with at least some illustrative embodiments. Hypervisor 200 (sometimes referred to as a "virtual machine monitor") includes one or more virtual machine software programs that are loaded into memory 110 and are executed by processor 102. Hypervisor 200 maintains control over, as well as isolation between, the one or more virtual machines executing within the operational environment created by Hypervisor 200. In some illustrative embodiments, Hypervisor 200 includes the basic input and output system (BIOS) software, while in other illustrative embodiments the BIOS includes Hypervisor 200. In still other illustrative embodiments, Hypervisor 200 is included as part of an operating system executing on processor 102, while in still other illustrative embodiments Hypervisor 200 executes as an application program within an operating system already executing on processor 102. Other variations and combinations of BIOS software, operating system software and hypervisor software will become apparent to those of ordinary skill in the art, and all such variations and combinations are within the scope of the present disclosure.

Three virtual machines (VM 300, VM 400 and VM 500) are shown executing within the operating environment created by Hypervisor 200 of FIG. 1. Each virtual machine emulates and/or simulates a real computer system, similar to computer system 100. Thus, each virtual machine includes a virtual processor (vProc 312, 412 and 512), virtual memory devices (vMem[0] (220) and vMem[1] (221) included within VM 300, vMem[2] (222) within VM 400, and vMem[3] (223) within VM 500), and virtual firmware (vF/W 316, 416 and 516). The virtual firmware includes programs similar to those include in real firmware, such as, for example, BIOS code (not shown) and hardware and power control interface code, such as virtual Advanced Control and Power Interface (vACPI) firmware 318, shown within virtual firmware 316 of virtual machine 300. Although the embodiment of FIG. 1 includes virtual ACPI firmware, other illustrative embodiments may include other virtualized hardware interface firmware (e.g., the Extensible Firmware Interface (EFI) by Intel®) and all such virtualized hardware interface firmware is within the scope of the present disclosure.

vACPI 318 provides software executing on virtual processor 312 with an interface to the virtualized hardware of virtual machine 300. Such software includes, for example, operating system 314 of FIG. 1 (which includes virtual memory resource driver (vMRDvr) 315). vACPI 318 maintains a series of objects that each corresponds to a virtualized hardware element, and that each includes information related to the configuration and status of each virtualized hardware element. Thus, for example, vMemObj[0] (virtual memory object 320) is a virtualized ACPI object within virtual machine 300 that includes information related to vMem[0] (virtual memory device 220), and similarly vMemObj[1] (virtual memory object 321) is a virtualized ACPI object that includes information related to vMem[1] (virtual memory device 221). The information included within these objects may include, for example, the base address and address range of the device within the memory address space of virtual machine 300.

Virtual ACPI 318 of the illustrative embodiment of FIG. 1 also maintains virtual memory resource object (vMRsrcObj) 330, which is associated with a device type of a group a virtual devices (here, in the illustrative embodiment shown, a group of virtual memory devices). Virtual memory resource object 330 provides a single point of status and control for "hot swapping" groups of virtual memory devices (i.e., adding or removing virtual memory devices without resetting or rebooting the corresponding virtual machine). Thus, for example, if a request to eject a specific amount of memory is received by vACPI 318 from hypervisor 200 (e.g., via a general purpose event or GPE), a single aggregated eject notification is sent by vACPI 318 to virtual memory resource object 330, which in turn sends a request to virtual memory resource driver 315. Virtual memory resource object 330 also provides a single point for obtaining status and/or information about groups of device objects. Thus, for example, virtual memory resource driver 315 can issue a single query to virtual memory resource object 330 to obtain information about each of the virtual memories in a virtual machine (e.g., a list of virtual memory objects corresponding to the virtual memory devices to be ejected, or the size of the amount of memory to be ejected).

Virtual memory resource driver 315 interacts with operating system 314 to determine if enough virtual memory devices to satisfy are either not in use, or are being accessed by swappable tasks that can be moved out of memory (making the memory available for ejection). If virtual memory resource driver 315 identifies enough virtual memory devices to satisfy the request, individual eject requests for each virtual memory device are generated internally (i.e., within operating system 314) by virtual memory resource driver 315 and sent to each virtual memory object corresponding to a memory device to be ejected (e.g., virtual memory object 320 of FIG. 1). Virtual memory resource object 330 returns a completion status of the aggregated ejection to hypervisor 200 (based on the completion status received from virtual memory resource driver 315) once the individual eject operations have completed.

The operation of virtual memory resource object 330 and virtual memory resource driver 315 of the illustrative embodiment of FIG. 1 enables the ejection of multiple virtual memory devices using a single request, and further allows the ejection request to be denied without first attempting to eject one or more virtual memory devices. Because virtual memory resource driver 315 determines if enough memory devices are available to satisfy the request before any of the individual eject requests are issued to the individual virtual memory objects, the request will not alter the configuration of the system unless the request can succeed in ejecting the amount of memory requested. Further, the use of a single request directed to virtual memory resource driver 315, as well as the issuance of only the number of individual ejections needed to satisfy the original request, result in a more efficient eject operation, as compared to a hypervisor attempting individual ejections of each virtual memory device, and possibly having to attempt ejecting all of the virtual memory devices in the virtual machine, one at a time. Also, if more memory devices are available than are needed, virtual memory resource driver can select for ejection those virtual memory devices that require the least overhead to eject (e.g., memories that are not in use as opposed to memories that require swapping data out). Such a selection allows for faster overall execution of the ejections.

In at least some illustrative embodiments, the request to eject virtual memory devices sent by hypervisor 200 to virtual resource object 330 includes a list of specific virtual memory devices identified for ejection, rather than an amount of memory to eject. In such an embodiment, virtual resource object 330 again sends a single request to virtual memory resource driver 315, but instead of scanning all available memory to find enough virtual memory devices to satisfy the request, only those virtual memory devices listed in the request are checked to determine if the memory range corresponding to the virtual memory devices is not in use (or is being used by swappable tasks). If any of the listed devices are not available, the request is rejected. Otherwise ejection requests are sent to each virtual memory object corresponding to each listed virtual memory device. Virtual memory resource object 330 returns a completion status of the aggregated ejection to hypervisor 200 (based on the completion status received from virtual memory resource driver 315) once the individual eject operations have all completed.

In at least some illustrative embodiments, hypervisor 200 maintains a repository of unallocated virtual memory devices (i.e., virtual memory devices that have not been added to a virtual machine), as shown in FIG. 1 (virtual memory devices 224-227 (vMem[4-7])). The virtual memory devices in this repository may be drawn upon, together with virtual memory devices ejected from one or more virtual machines, to provide virtual memory devices to other virtual machines within computer system 100 on an as-needed basis. In other illustrative embodiments, virtual memory devices may be created and allocated to virtual machines "on-the-fly" as they are needed, rather than maintained in a pool of unallocated virtual memory devices within hypervisor 200.

Both the allocated and unallocated virtual memory devices of the illustrative embodiment of FIG. 1 include subdivisions or subsets of one or more real memory devices included within memory 110. Thus, for example, in at least one illustrative embodiment memory 110 includes 4 real, 1 GB memory devices (e.g., 4, 1 GB dual inline memory modules or DIMMs), whereas each virtual memory device only includes 256 MB of real memory. Virtual memories 220-223 utilize the 1 GB of memory in a first DIMM, virtual memories 224-227 utilize the 1 GB of memory of a second DIMM, and the remaining 2 GB of memory of the remaining 2 DIMMS is utilized by hypervisor 200 and/or any other application program executing on real processor 102. Many other organizations and combinations of real and virtual memory devices will become apparent to those of ordinary skill in the art, and all such organizations and combinations are within the scope of the present disclosure.

Figure 2A:
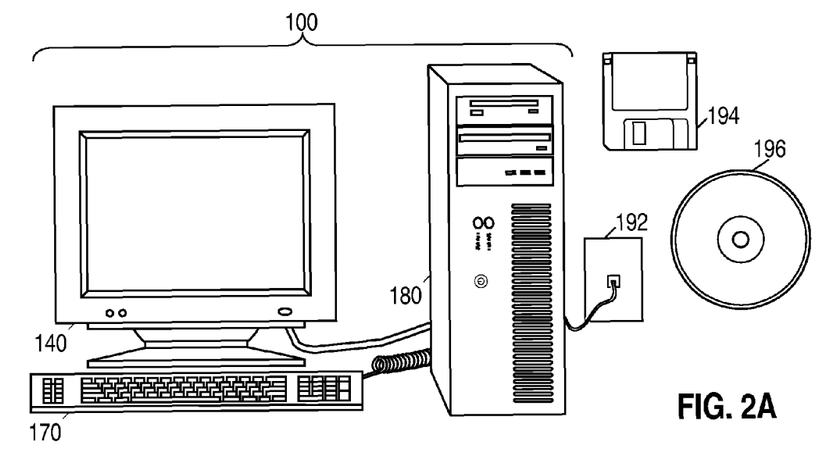
FIG. 2A shows an example of the computer system of FIG. 1, constructed in accordance with at least some illustrative embodiments.
Figure 2B:
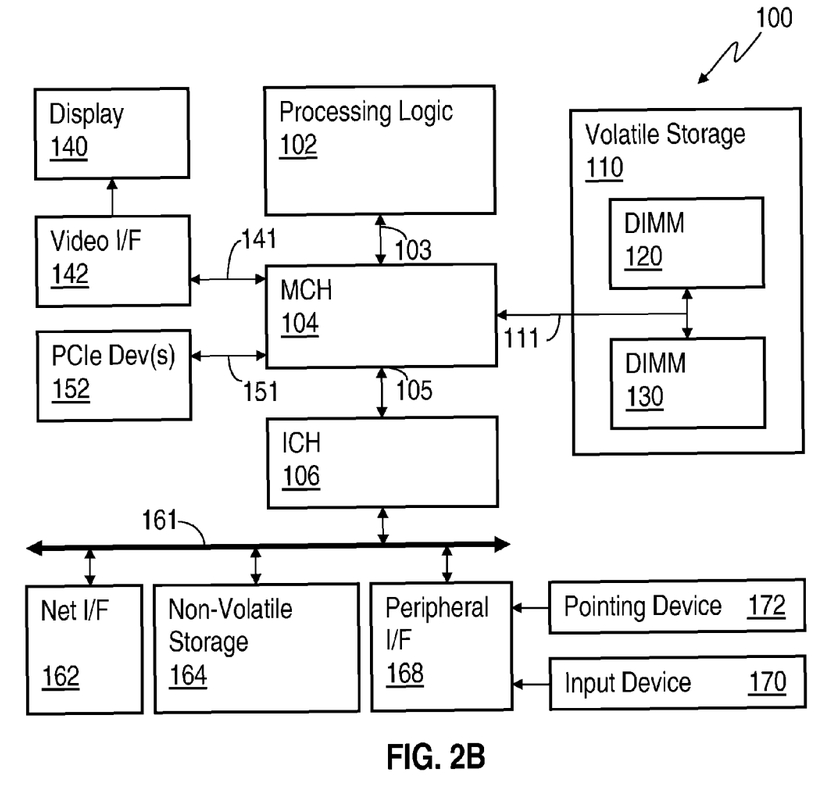
FIG. 2B shows a block diagram of the computer system of FIG. 2A, constructed in accordance with at least some illustrative embodiments.

FIGS. 2A and 2B show an illustrative computer system 100 suitable for executing the virtualization software (hypervisor 200 and virtual machines 300, 400 and 500) of FIG. 1. As shown, the illustrative computer system 100 includes a chassis 180, a display 140, and an input device 170. The computer system 100 includes processing logic 102, volatile storage 110, and non-volatile storage 164. Processing logic 102 may be implemented in hardware (e.g., a microprocessor), software (e.g., microcode), or a combination of hardware and software. Computer system 100 also includes a computer-readable medium. The computer-readable medium includes volatile storage 110 (e.g., random access memory (RAM)), non-volatile storage 164 (e.g., flash RAM, read-only memory (ROM), a hard disk drive, a floppy disk (e.g., floppy 194), a compact disk read-only memory (CD-ROM, e.g., CD 196)), or combinations thereof.

Either or both of volatile storage 110 and non-volatile storage 164 include, for example, software that is executed by processing logic 102 and provides the computer system 100 with some or all of the functionality described herein. The computer system 100 also includes a network interface (Net I/F) 162 that enables the computer system 100 to receive information via a local area network and/or a wired or wireless wide area network, represented in the example of FIG. 2A by Ethernet jack 192. A video interface (Video I/F) 142 couples to the display 140. A user interacts with the station via the input device 170 (e.g., a keyboard) and/or pointing device 172 (e.g., a mouse), which couples to a peripheral interface 168. The display 140, together with the input device 170 and/or the pointing device 172, may operate together as a user interface.

Computer system 100 may be a bus-based computer, with a variety of busses interconnecting the various elements shown in FIG. 2B through a series of hubs or bridges, including memory controller hub (MCH) 104 (sometimes referred to as a "north bridge") and interface controller hub (ICH) 106 (sometimes referred to as a "south bridge"). The busses of the illustrative example of FIG. 2B include: front-side bus 103 coupling processing logic 102 to MCH 104; accelerated graphics port (AGP) bus 141 coupling video interface 142 to MCH 104; peripheral component interconnect (PCI) bus 161 coupling network interface 162, non-volatile storage 164, peripheral interface 168 and ICH 106 to each other; PCI express (PCIe) bus 151 coupling one or more PCI express devices 152 to MCH 104; and memory bus 111 coupling MCH 104 to dual inline memory modules (DIMMs) 120 and 130 within volatile storage 110.

The peripheral interface 168 accepts signals from the input device 170 and other input devices such as a pointing device 172, and transforms the signals into a form suitable for communication on PCI bus 161. The video interface 142 may include a graphics card or other suitable video interface that accepts information from the AGP bus 141 and transforms it into a form suitable for the display 140. The processing logic 102 gathers information from other system elements, including input data from the peripheral interface 168, and program instructions and other data from non-volatile storage 164 or volatile storage 110, or from other systems (e.g., a server used to store and distribute copies of executable code) coupled to a local area network or a wide area network via the network interface 162. The processing logic 102 executes the program instructions (e.g., Hypervisor 200) and processes the data accordingly. The program instructions may further configure the processing logic 102 to send data to other system elements, such as information presented to the user via the video interface 142 and the display 140. The network interface 162 enables the processing logic 102 to communicate with other systems via a network (e.g., the Internet). Volatile storage 110 may serve as a low-latency temporary store of information for the processing logic 102, and non-volatile storage 164 may serve as a long term (but higher latency) store of information.

The processing logic 102, and hence the computer system 100 as a whole, operates in accordance with one or more programs stored on non-volatile storage 164 or received via the network interface 162. The processing logic 102 may copy portions of the programs into volatile storage 110 for faster access, and may switch between programs or carry out additional programs in response to user actuation of the input device 170. The additional programs may be retrieved from non-volatile storage 164 or may be retrieved or received from other locations via the network interface 162. One or more of these programs executes on computer system 100, causing the computer system to perform at least some functions disclosed herein.

Figure 3A:
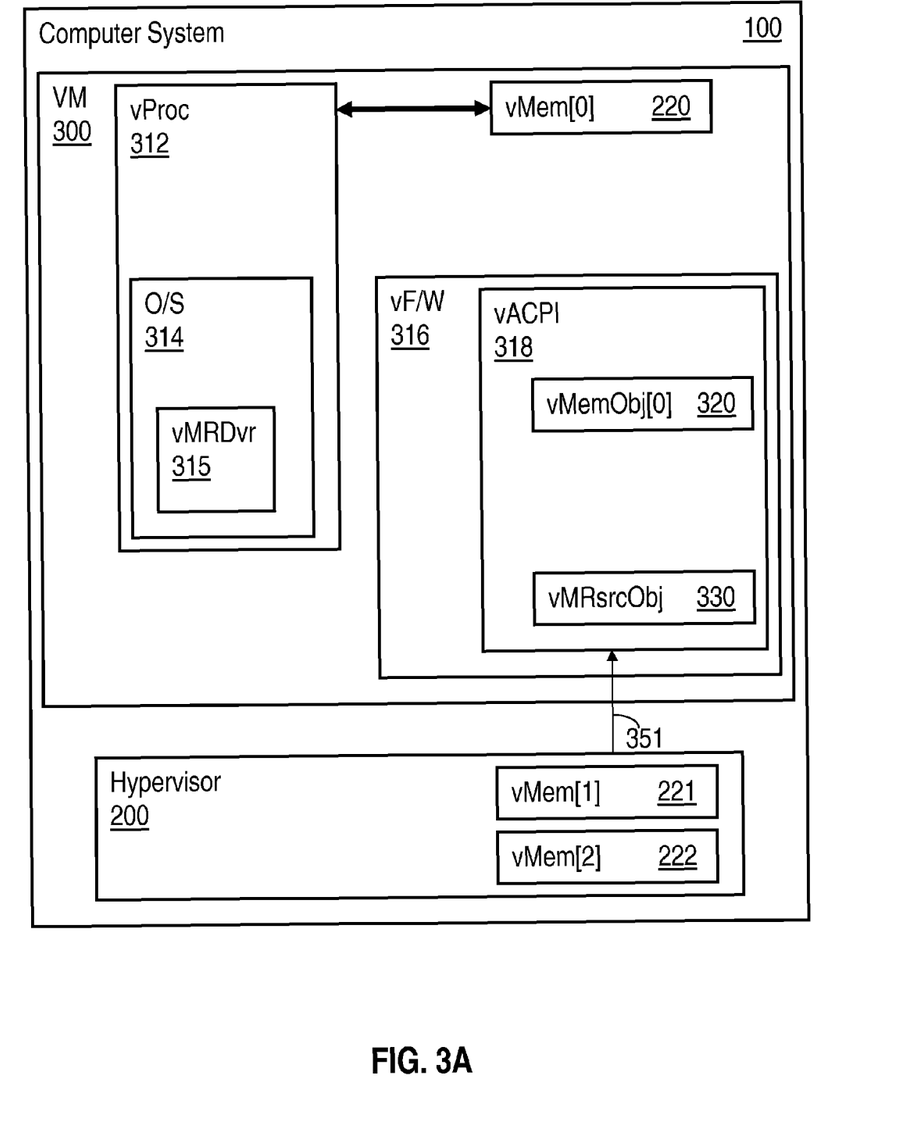
FIGS. 3A through 3C show an example of adding an additional virtual memory resource to a virtual machine, in accordance with at least some illustrative embodiments.
Figure 3B:
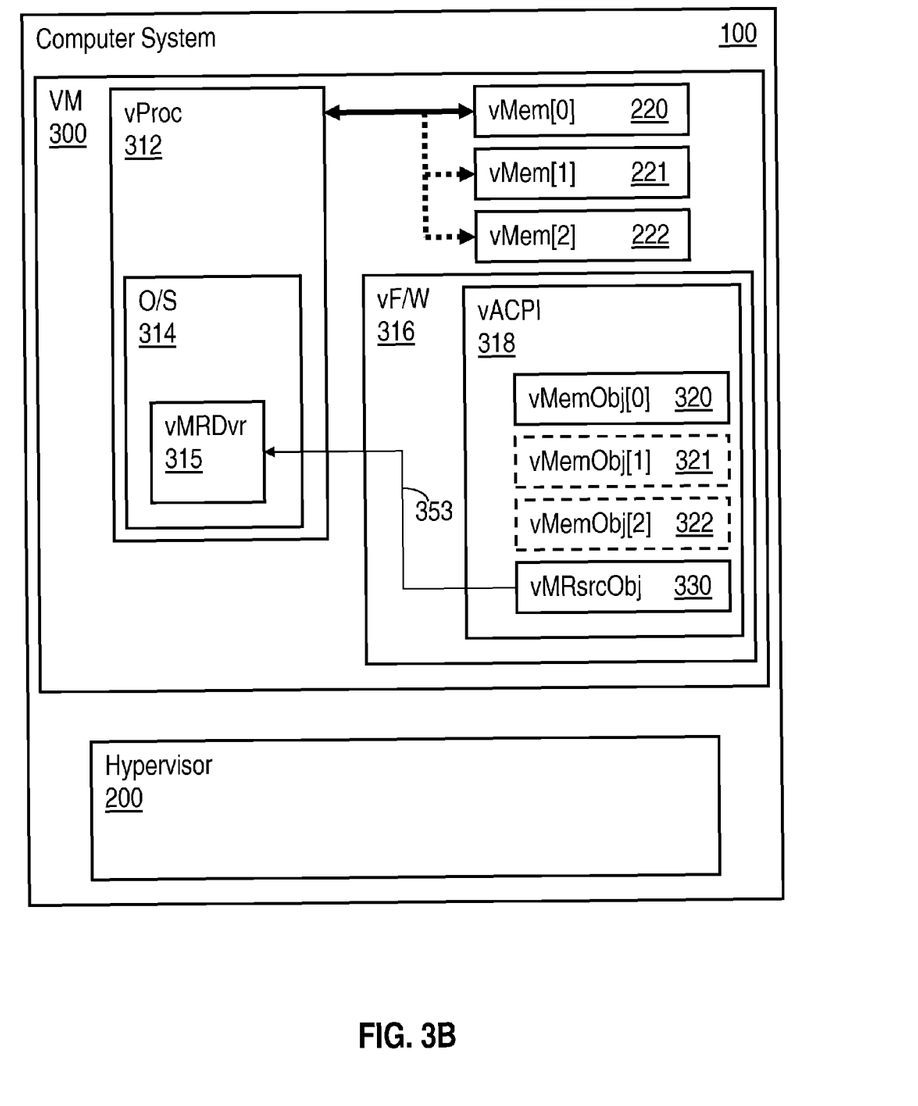
Figure 3C:
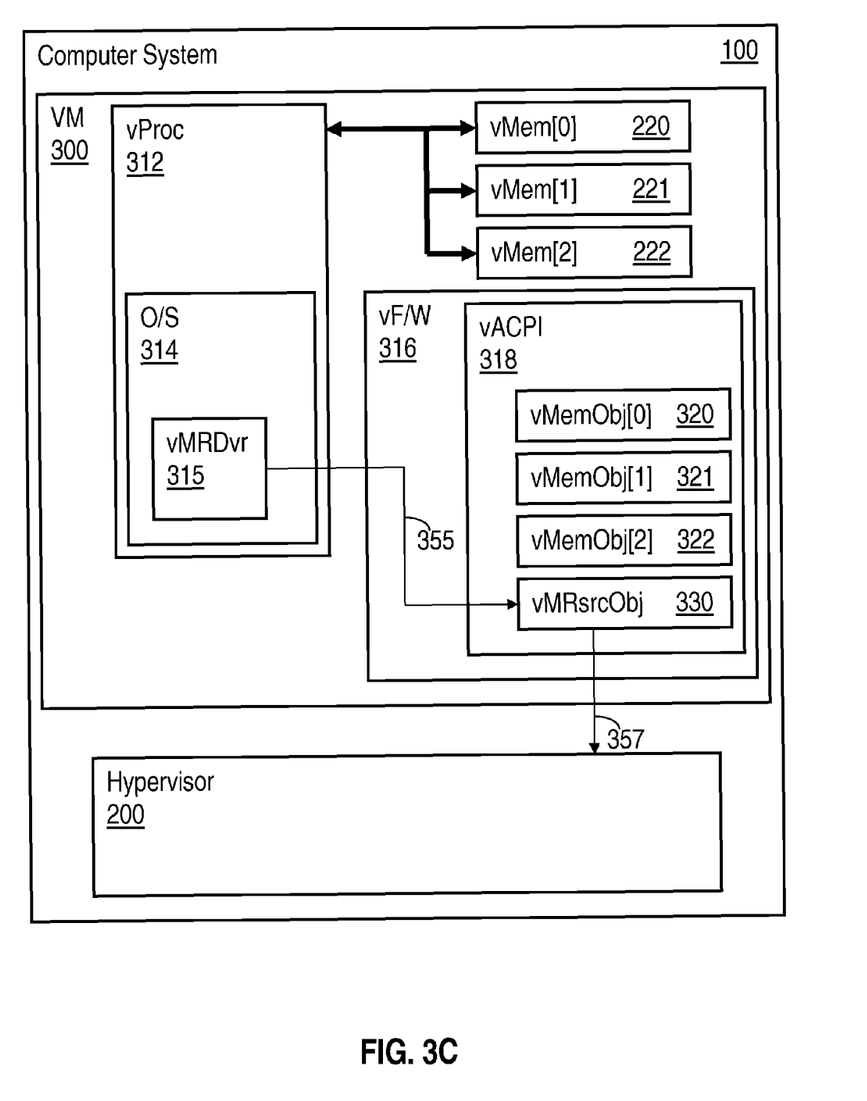

FIGS. 3A through 3C show an example of an addition of a virtual memory device by hypervisor 200 to virtual machine 300, in accordance with at least some illustrative embodiments. FIG. 3A shows virtual machine 300 with virtual memory device 220 already allocated. Virtual memory devices 221 and 222 are maintained by hypervisor 200 as unallocated virtual memory devices within a pool of unallocated virtual memory devices, available to be allocated upon request. Although the embodiment of FIGS. 3A through 3C show a static pool of unallocated virtual memory devices, in other illustrative embodiments the virtual memory devices are created on an "as-needed" or "on-the-fly" basis such as, for example, when an allocation request is received by hypervisor 200 (e.g., from an operator issuing a request via a user interface associated with computer system 100); when a request is generated internally by hypervisor 200 based upon the level of memory utilization of the memory already allocated to each virtual machine as monitored by hypervisor 200; or when a request is generated by a virtual machine to the hypervisor based upon the level of memory utilization of the virtual machine as monitored by the virtual machine.

FIG. 3A shows the initial request 351 to add a virtual memory device being sent from hypervisor 200 to vACPI 318. Hypervisor 200 sends the add request to vACPI 318 in the form of a virtual "hot-plug" indication (e.g., as an ACPI general purpose event or GPE). FIG. 3B shows the initial response to the request, wherein previously unallocated virtual memory devices 221 and 222 are added to virtual machine 300, but are not yet available for use, as indicated by the dashed line between virtual memory devices 221 and 222 and the bus that couples virtual processor 312 to virtual memory device 220. Virtual memory device objects 321 and 322 are added by vACPI 318, but have not yet been recognized by operating system 314 (as indicated by the dashed lines around the memory objects). In at least some illustrative embodiments, the virtual memory objects already exist in the ACPI namespace, and are transitioned from a disabled state to an enabled state in response to the addition of virtual memory devices 221 and 222. The hot plug notification 353 is forwarded by virtual memory resource object 330 to virtual memory resource driver 315, and reflects the addition of virtual memory devices 221 and 222 to the virtual hardware configuration of virtual machine 300. In at least some illustrative embodiments the notification 353 includes a list of the new virtual memory objects, while in other illustrative embodiments the list of new virtual memory objects can be obtained by querying the virtual memory resource object. Virtual memory resource driver 315 internally generates two individual hot-plug indications (one for each virtual memory device), causing operating system 314 to recognize the added virtual memory devices and to add the devices to the configuration of operating system 314, as shown in FIG. 3C. Once the additions of the individual virtual memory devices have been completed, virtual memory resource driver 315 sends a completion status 355 to virtual memory resource object 330, which in turn returns a completion status 357 to hypervisor 200.

Figure 4A:
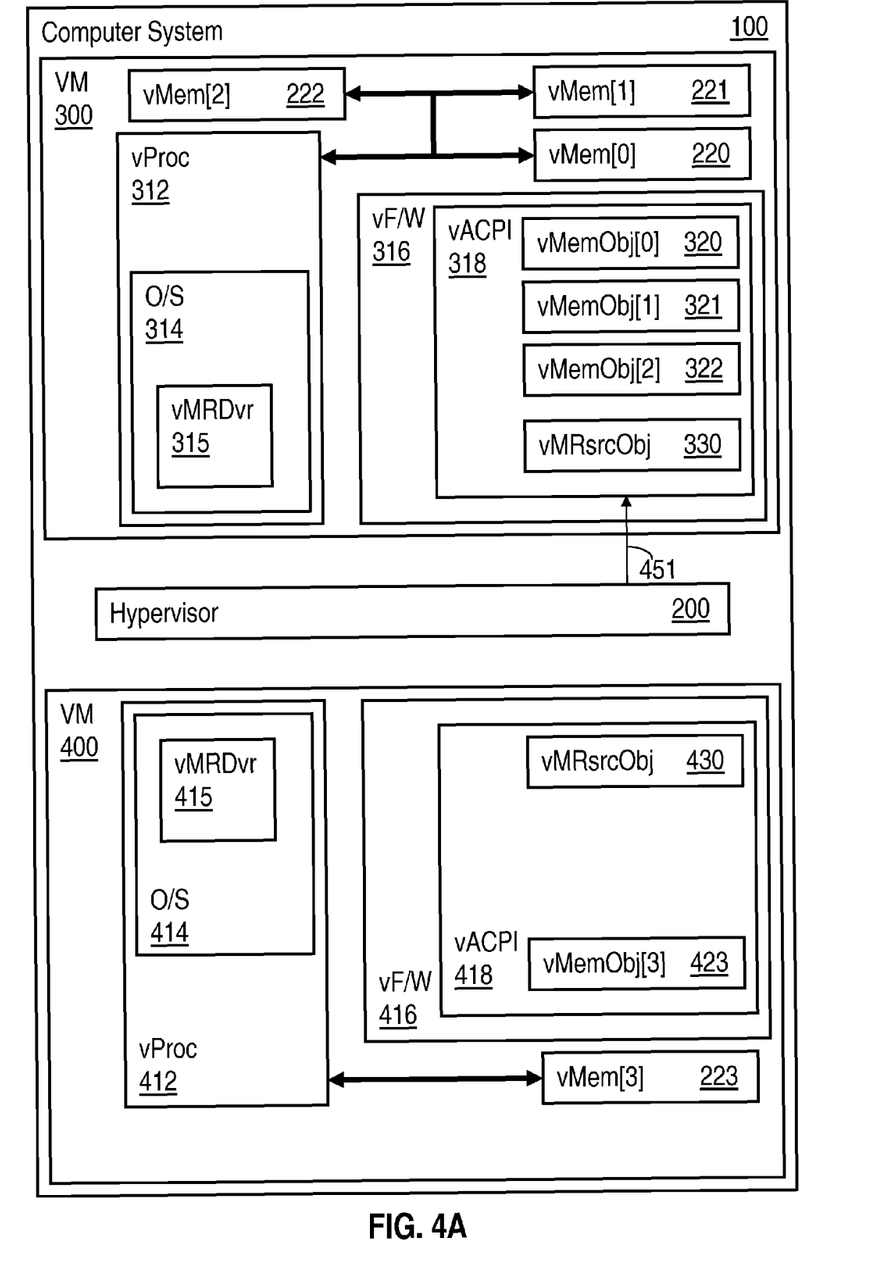
FIGS. 4A through 4E show an example of re-allocating a virtual memory resource from one virtual machine to another virtual machine, in accordance with at least some illustrative embodiments.

FIGS. 4A through 4D show a re-allocation of a virtual memory device from one virtual machine to another virtual machine, in accordance with at least some illustrative embodiments. FIG. 4A shows virtual memory devices 220, 221 and 222 already allocated to virtual machine 300, and virtual memory device 223 already allocated to virtual machine 400. When a request to re-allocate virtual memory from virtual machine 300 to virtual machine 400 is received, hypervisor 200 first issues a request 451 to de-allocate the necessary memory to vACPI 318, in the form of a "hot-unplug" or "eject" indication. In some illustrative embodiments the request may list the virtual memory devices to be ejected, while in other illustrative embodiments the request may specify one or more metrics (e.g., a memory size and a memory attribute such as write-back, volatile/non-volatile, and memory locality) which are converted by one or more functions within virtual memory resource driver 315 into the needed number of virtual memory devices.

Figure 4B:
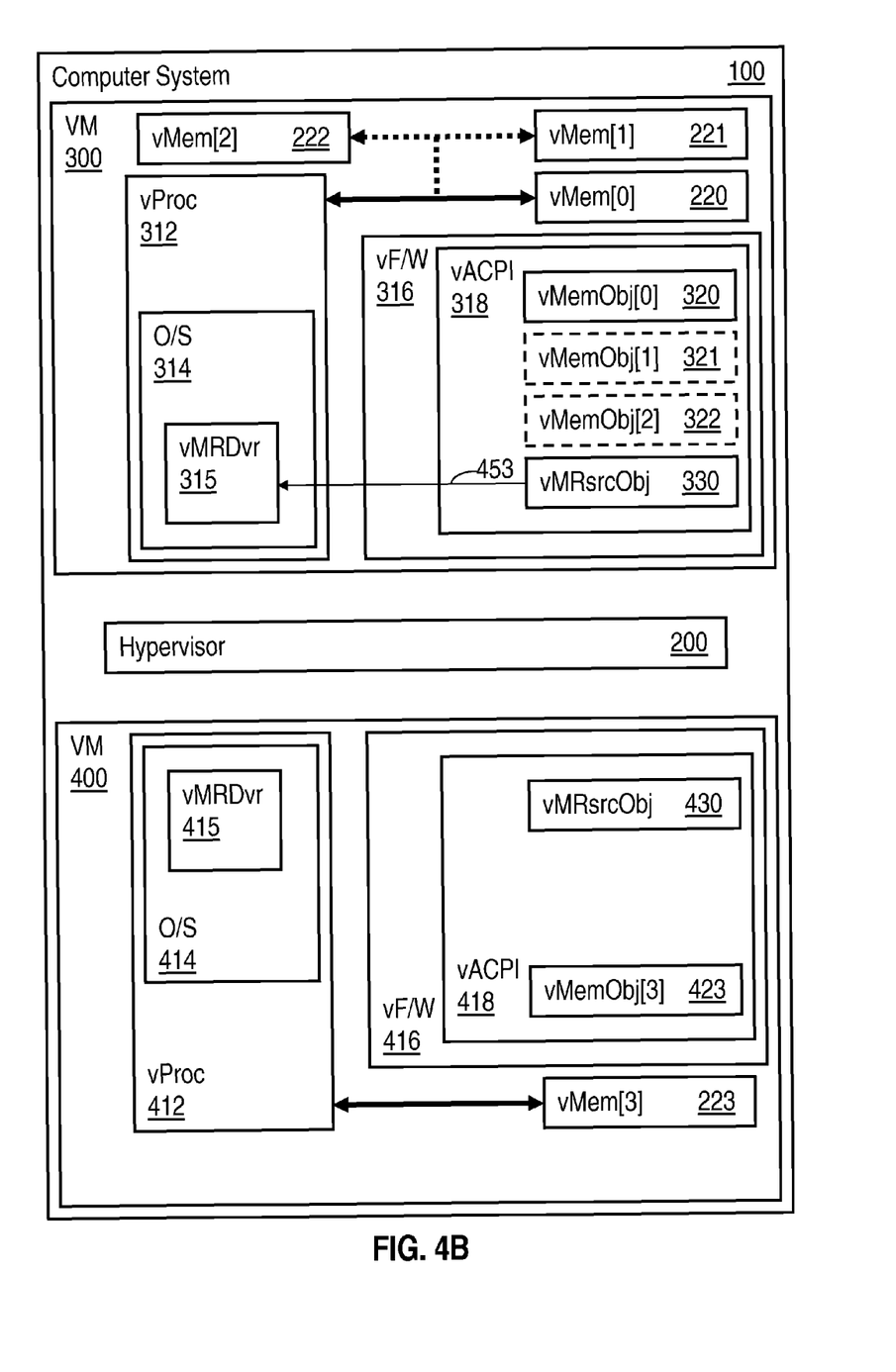
Figure 4C:
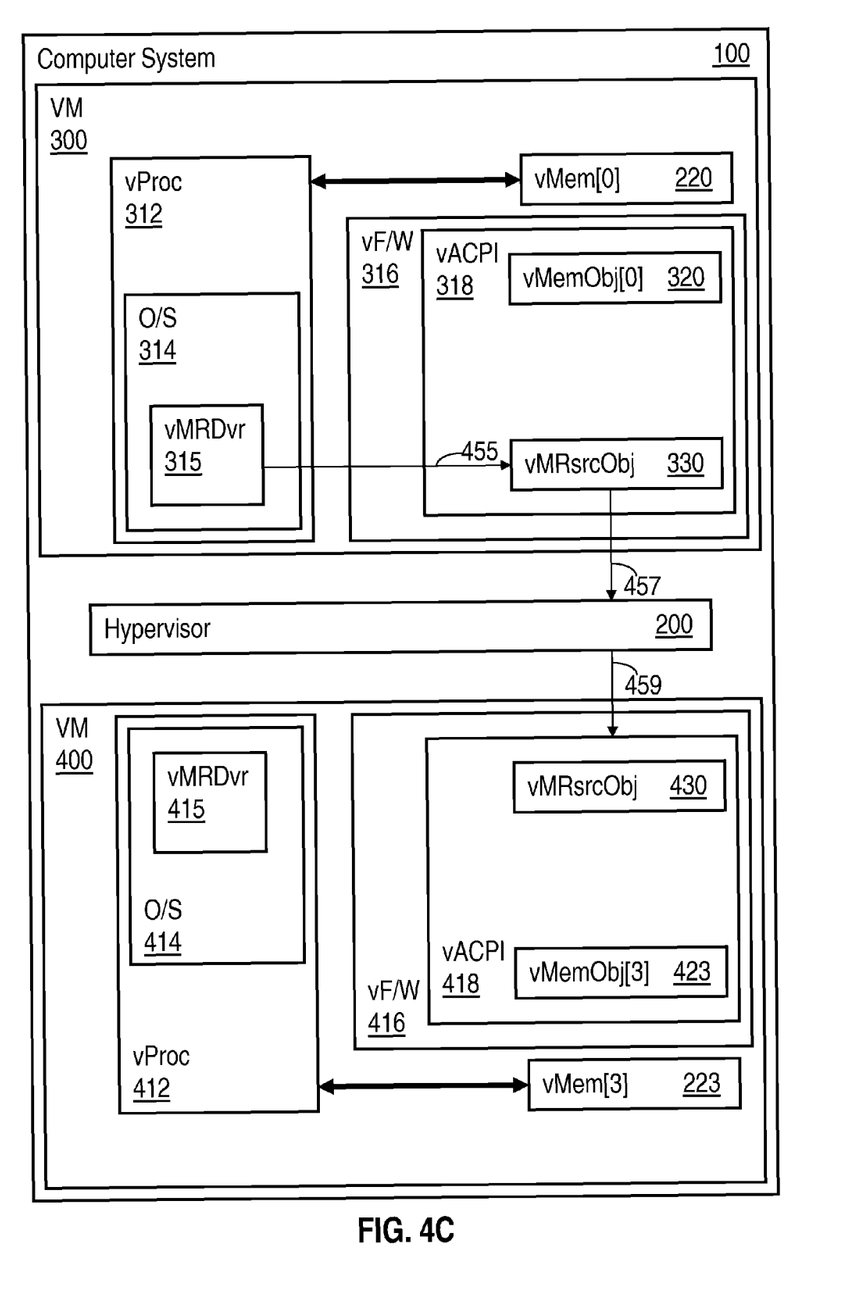

Referring to FIG. 4B, virtual aggregation object 330 forwards the ejection request 453 to virtual memory resource driver 315, which determines whether the needed resources are available. In the example of FIG. 4A through 4E, the request requires two available virtual memory devices, which are available, and can be de-allocated (ejected) from virtual machine 300. FIG. 4B shows the removal of virtual memory objects 321 and 322 (indicated by the dashed borders of the memory objects) and the corresponding virtual memory devices 221 and 222 (indicated by the dashed line from virtual memory devices 221 and 222 to the bus coupling virtual memory device 220 to virtual processor 312). As shown in FIG. 4C, upon completion of the ejection, virtual memory resource driver 315 sends a completion status 455 to virtual memory resource object 330, which in turn sends a completion status 457 to hypervisor 200.

Figure 4D:
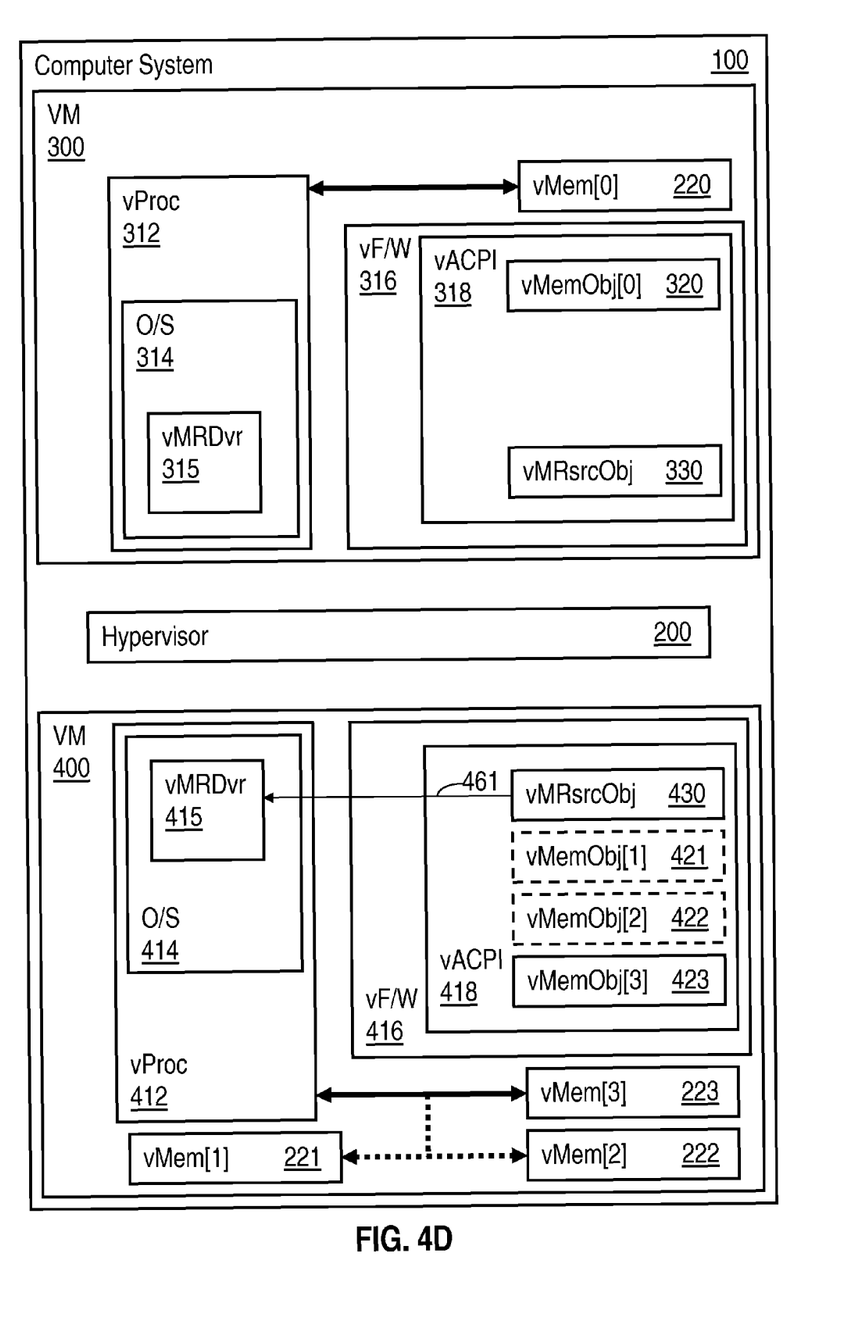
Figure 4E:
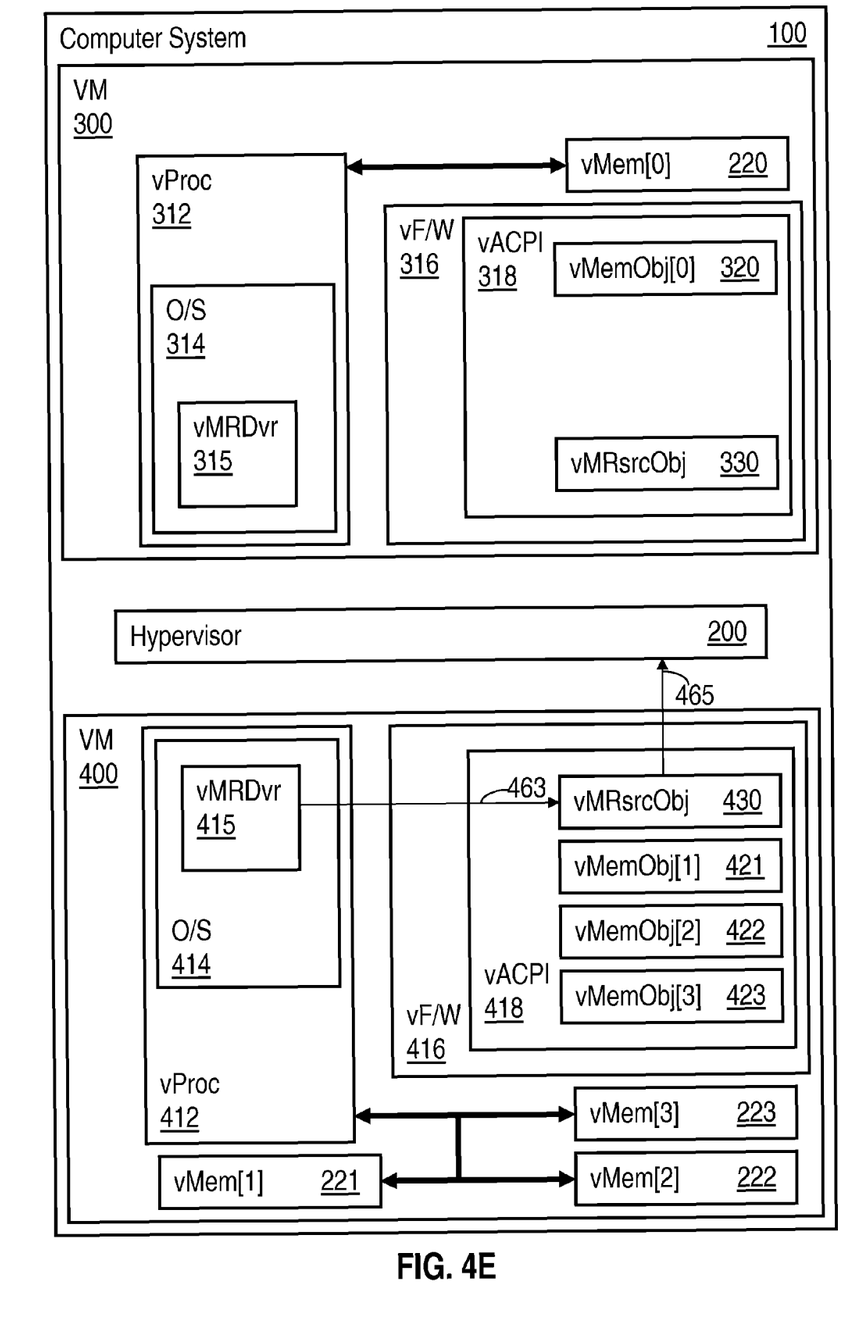

Once virtual memory devices 221 and 222 have been de-allocated (ejected) from virtual machine 300, hypervisor 200 causes an allocation request 459 (FIG. 4C) to be sent to vACPI 418 (in the form of a "hot-plug" indication), which in turn creates virtual memory objects 421 and 422 (indicated by the dashed virtual memory objects), and sends a hot plug notification message (461) to virtual memory resource driver 415, as shown in FIG. 4D. FIG. 4D also shows the addition of virtual memory devices 221 and 222 to virtual machine 400, and the initial recognition of the addition (indicated by the dashed line from virtual memory devices 221 and 222 to the bus coupling virtual memory device 223 and virtual processor 412). FIG. 4E shows the resulting allocation of virtual memory devices 221 and 222 to virtual machine 400. Upon completion of the addition of virtual memory devices 221 and 222, virtual memory resource driver sends a completion status 463 to virtual memory resource object 430, which in turn sends a completion status 465 to hypervisor 200.

In at least some illustrative embodiments, the request to eject virtual devices includes a metric that reflects a characteristic of the virtual device to be ejected. Thus, for example, the request to eject virtual memory devices 221 and 222 from virtual machine 300 in such embodiments (e.g., as shown in FIGS. 4A through 4C) includes an amount of memory in bytes to be ejected. Based upon the size of the virtual memory devices, the number of devices needed is determined by one or more functions within virtual memory resource driver 315, and if the number of devices needed to satisfy the request are not in use, or in use by swappable task and thus available, the requested virtual memory is ejected. For example, if each virtual memory device is 128 MB, and an ejection of 2 GB of memory is requested, the requested memory will be ejected if at least sixteen memory devices are available. Other metrics associated with different types of virtual devices may be used within requests to eject virtual devices, and all such metrics and virtual device types are within the scope of the present disclosure. By allowing requests for devices to be based on a metric rather than a list of specific, requested devices, load-balancing of resources is simplified since the programs requesting and or managing the virtual devices (e.g., an application executing on a virtual machine, or a hypervisor program) do not need to track or check which devices are in use prior to making the request.

Figure 5:
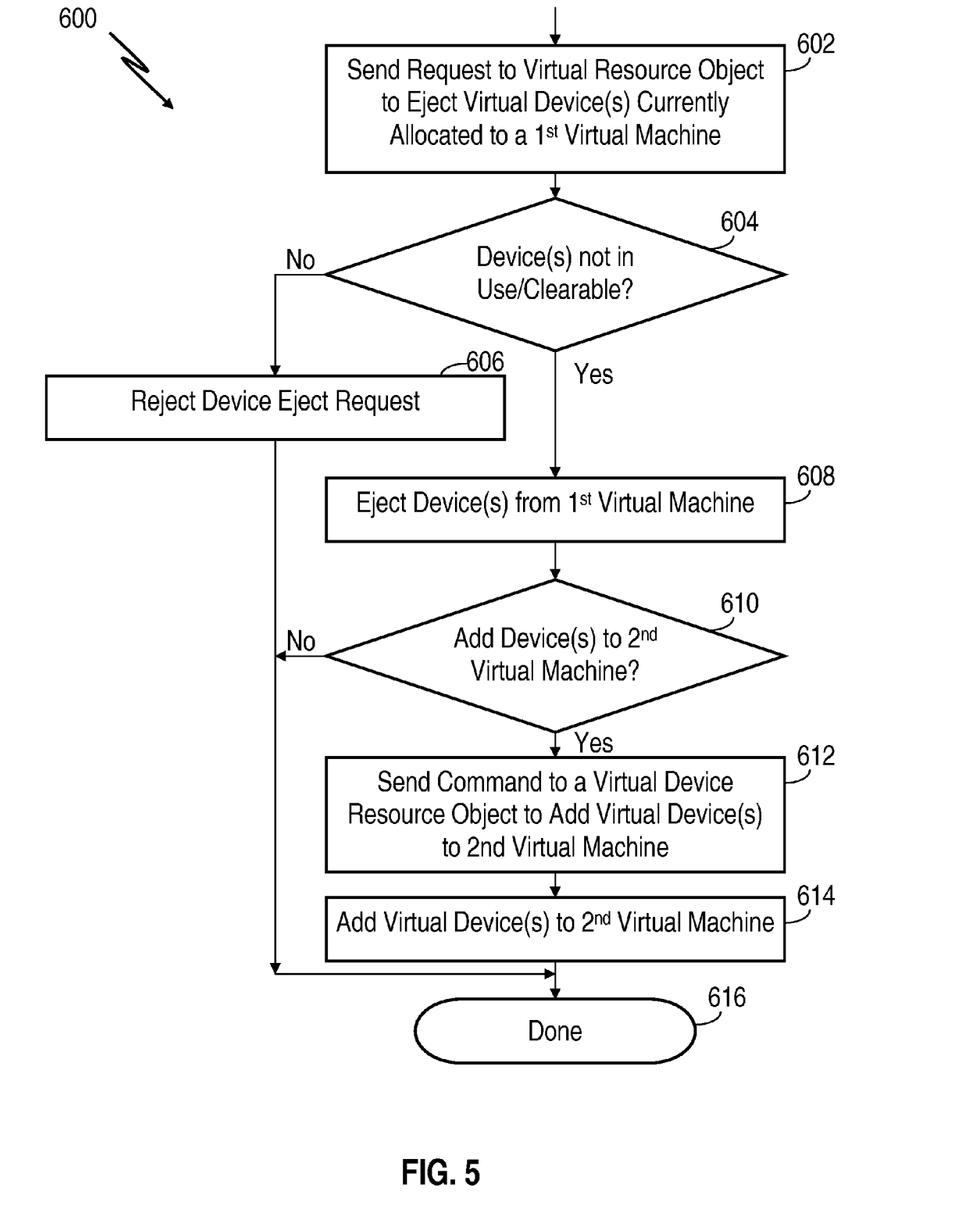
FIG. 5 shows a method for ejecting a virtual device from a first virtual machine and optionally re-allocating a virtual device to a second virtual machine, in accordance with at least some illustrative embodiments.

FIG. 5 shows a method 600 for ejecting and adding (i.e., re-allocating) one or more virtual devices from one virtual machine to another, in accordance with at least some illustrative embodiments. A request is sent to a virtual resource object within a first virtual machine to eject (de-allocate) one or more virtual devices currently allocated to the first virtual machine (block 602). If the virtual devices needed to satisfy the request are not in use by the first virtual machine, or in use but can be made available (e.g., content that can be swapped out and/or cleared out of a memory device), as shown in block 604, the requested virtual devices are ejected from the first virtual machine (block 608). If the virtual devices needed are in use and cannot be made available (i.e., cannot be cleared), as shown in block 604, the request is rejected (block 606), ending the method (block 616). If the ejected devices are to not be added to another virtual machine (block 610), the method ends (block 616). If the requested virtual devices are ejected (block 608), and one or more of the ejected devices are to be added to a second virtual machine (block 610), a command is sent to a virtual device resource object within the second virtual machine to add one or more virtual devices to the virtual machine (block 612). The request causes a virtual hot plug event to be generated and serviced by the virtual machine, and the requested virtual device is added to the virtual machine (block 614), ending the method (block 616).

The above discussion is meant to be illustrative of the principles and various embodiments of the present invention. Numerous variations and modifications will become apparent to those skilled in the art once the above disclosure is fully appreciated. For example, although at least some of the illustrative embodiments of the present disclosure describe adding and ejecting virtual memory devices, many other virtual devices may be added and ejected as describe herein, including devices such as virtual hard disk, virtual network adapters, and virtual processors (more than one per virtual machine, or virtual processors of differing effective speeds), just to name a few. Also, the metrics provided in the ejection requests described are not limited to a memory size and may be any number of metrics associated with the many virtual devices that can be ejected. Examples of such metrics may include the transfer bandwidth of a virtual hard disk, the communication bandwidth of a virtual network adapter, the number of virtual processors, the processing capacity of a virtual processor (e.g., in millions of instructions per seconds or MIPS), and the speed of a virtual processor, each of which may be expressed as a proportion of a corresponding metric of one or more real devices. It is intended that the following claims be interpreted to embrace all such variations and modifications.

What is claimed is:

1. A method, comprising:
executing virtual machine software on a real computer system, the virtual machine software comprising a hypervisor and a virtual machine comprising a plurality of virtual devices;
associating each of the plurality of virtual devices with a unique subset of a real device within the real computer system;
the hypervisor sending to virtual firmware within the virtual machine a request to eject that requires ejecting from the virtual machine one or more virtual devices of the plurality of virtual devices;
a virtual device resource object within the virtual firmware forwarding the request to eject to a virtual device resource driver executing on the virtual machine; and
the virtual device resource driver causing individual ejections from the virtual machine of each of the one or more virtual devices in response to the forwarded request, the hypervisor neither receiving nor intercepting any individual ejection message.

2. The method of claim 1, further comprising associating the virtual device resource object with a device type of the plurality of virtual devices.

3. The method of claim 1, further comprising:
determining the number of virtual devices needed to satisfy the request to eject based upon a metric included in the request to eject; and
ejecting from the virtual machine the virtual devices determined to be needed, if a sufficient number of virtual devices are available.

4. The method of claim 3, further comprising determining which of the plurality of virtual devices are used to satisfy the request to eject, wherein the determining of the number of virtual devices needed and the determining of which of the plurality of virtual devices are used is performed by the virtual device resource driver.

5. The method of claim 1, further comprising:
determining which virtual devices are identified for ejection based upon a list of virtual devices included in the request; and
ejecting from the virtual machine the virtual devices listed in the request, if the virtual devices listed are available.

6. The method of claim 1, further comprising:
the hypervisor sending to the virtual device resource object a request to add one or more virtual devices to the virtual machine;
the virtual device resource object forwarding the request to add to the virtual device resource driver; and
the virtual device resource driver causing the one or more virtual devices to each be individually added to the virtual machine.

7. A computer-readable tangible medium comprising software that causes a processor to:
execute virtual machine software on a real computer system, the virtual machine software comprising a hypervisor and a virtual machine comprising a plurality of virtual devices;

associate each of the plurality of virtual devices with a unique subset of a real device within the real computer system;

cause the hypervisor to send to virtual firmware within the virtual machine a request to eject that requires ejecting from the virtual machine one or more virtual devices of the plurality of virtual devices;

cause a virtual device resource object within the virtual firmware to forward the request to eject to a virtual device resource driver executing on the virtual machine; and cause the virtual device resource driver to initiate individual ejections from the virtual machine of each of the one or more virtual devices in response to the forwarded request, the hypervisor neither receiving nor intercepting any individual ejection message.

8. The computer-readable medium of claim 7, wherein the software further causes the processor to associate the virtual device resource object with a device type of the plurality of virtual devices.

9. The computer-readable medium of claim 7, wherein the software further causes the processor to:

determine the number of virtual devices needed to satisfy the request to eject based upon a metric included in the request to eject; and eject from the virtual machine the virtual devices determined to be needed, if a sufficient number of virtual devices are available.

10. The computer-readable medium of claim 9, wherein the software further causes the processor to cause the virtual device resource driver to determine the number of virtual devices needed, and to determine which of the plurality of virtual devices are used to satisfy the request to eject.

11. The computer-readable medium of claim 9, wherein the software further causes the processor to:

determine the which virtual devices are identified for ejection based upon a list of virtual devices provided in the request; and eject from the virtual machine the virtual devices listed in the request, if the virtual devices listed are available.

12. The computer-readable medium of claim 9, wherein the software further causes the processor to cause the hypervisor to send to the virtual device resource object a request to add one or more virtual devices to the virtual machine;

cause the virtual device resource object to forward the request to add to the virtual device resource driver; and cause the virtual device resource driver to cause the one or more virtual devices to each be individually added to the virtual machine.

13. A computer system, comprising:

a real processor executing virtual machine software that implements a virtual machine, the virtual machine comprising a hypervisor, a virtual processor, a virtual resource device driver, virtual firmware comprising a virtual device resource object, and a plurality of virtual devices; and a real device coupled to the real processor, the virtual machine software associating each of the plurality of virtual devices with a unique subdivision of the real device;

wherein the hypervisor executing on the real processor sends a request to the virtual firmware that requires ejecting from the virtual machine one or more virtual devices of the plurality of virtual devices; and the virtual device resource object within the virtual firmware forwarding the request to eject to a virtual device resource driver executing on the virtual machine;

wherein the virtual device resource object causes the virtual resource device driver to individually eject from the virtual machine the one or more virtual devices requested, the hypervisor neither receiving nor intercepting any individual ejection request or message.

14. The computer system of claim 13, wherein the virtual device resource object is associated with a device type of the plurality of virtual devices.

15. The computer system of claim 13, wherein the real device comprises a real memory device, and the plurality of virtual devices comprises a plurality of virtual memory devices each associated with a unique sub-range of an address space occupied by the real memory device.

16. The computer system of claim 13, wherein the virtual resource device driver determines the number of virtual devices needed to satisfy the request to de-allocate based upon a metric included in the request to eject and further determines which of the plurality of virtual devices are selected to be used to satisfy the request to eject; and wherein the virtual machine software ejects the virtual devices determined to be needed and selected to be used, if a sufficient number of virtual devices are determined by the virtual resource device driver to not be in use.

17. The computer system of claim 16, wherein the real device comprises a real memory device, the plurality of virtual devices comprises a plurality of virtual memory device, and the metric comprises a virtual memory size or a virtual memory attribute.

18. The computer system of claim 16, wherein the real device comprises a real processor, the plurality of virtual devices comprises a plurality of virtual processors, and the metric comprises a number of virtual processors.

19. The computer system of claim 13, wherein the virtual resource device driver determines which virtual devices are identified for ejection based upon a list of virtual devices provided in the request; and wherein the virtual machine software ejects from the virtual machine the virtual devices listed in the request, if the virtual devices listed are available.

20. The computer system of claim 13, wherein the executive software further sends a request to the virtual device resource object to add to the virtual machine one or more virtual devices;

wherein the virtual device resource driver forward the request to add to the virtual device resource driver; and wherein the virtual device resource driver causes the one or more virtual devices to be individually added to the virtual machine.

* * * * *